Sept. 1, 1925.  
W. G. BRYAN  
BRAKE MECHANISM FOR MOTOR VEHICLES  
Filed March 6, 1923
1,551,929
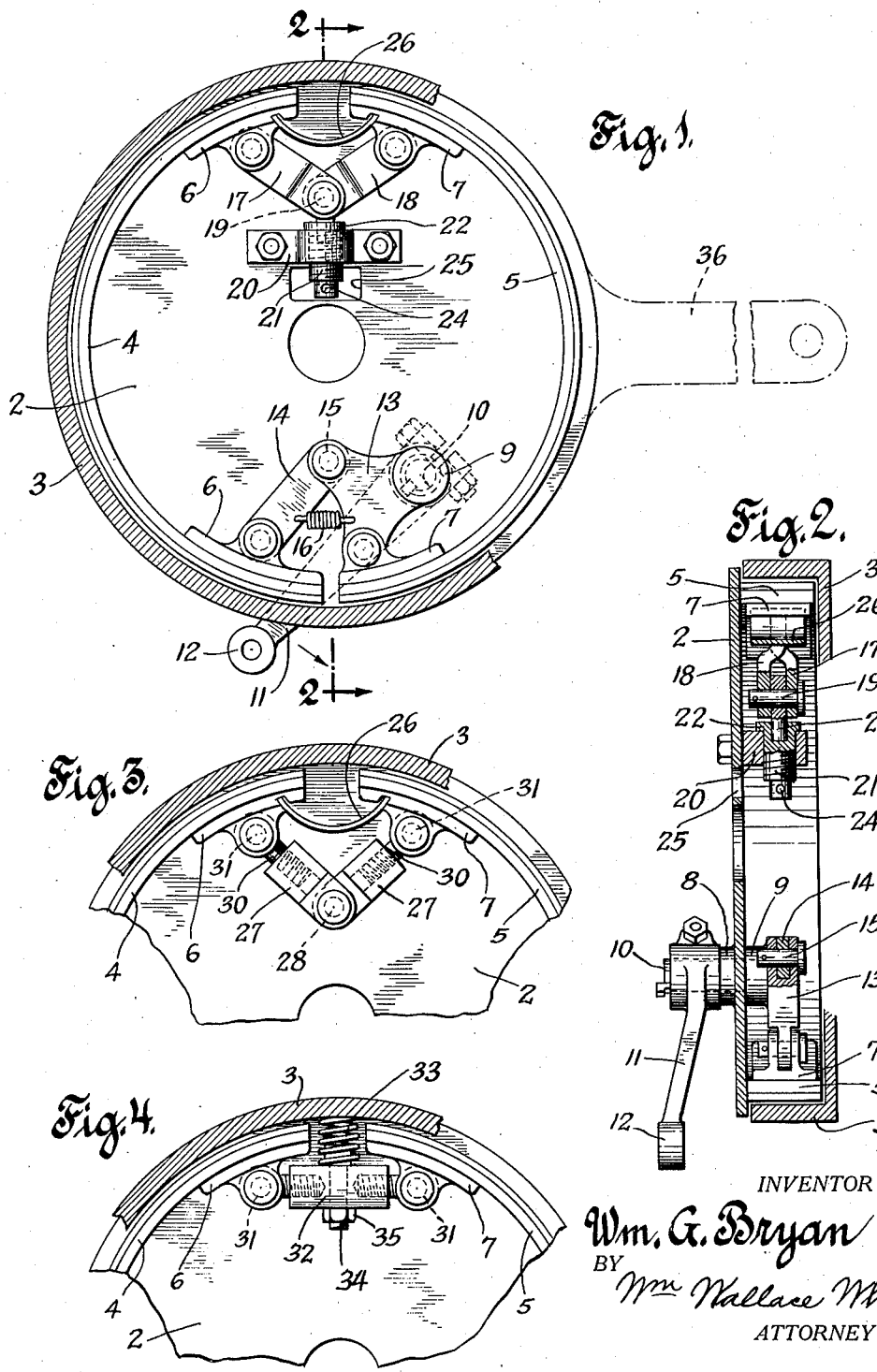
INVENTOR  
Wm. G. Bryan  
BY Wm Wallace White  
ATTORNEY Patented Sept. 1, 1925.

1,551,929

UNITED STATES PATENT OFFICE.

WILLIAM GEORGE BRYAN, OF SYDNEY, NEW SOUTH WALES, AUSTRALIA.

BRAKE MECHANISM FOR MOTOR VEHICLES.

Application filed March 6, 1923. Serial No. 623,099.

*To all whom it may concern:*

Be it known that I, WILLIAM G. BRYAN, a subject of the King of Great Britain, residing at Sydney, New South Wales, Australia, have invented new and useful Improvements in Brake Mechanism for Motor Vehicles, of which the following is a specification.

This invention relates to brake mechanism for motor vehicles, the principal object of the invention being to provide a brake mechanism of generally improved and simplified construction and which is extremely efficient and reliable in operation.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figure 1 is a vertical, sectional view of a brake mechanism illustrating a preferred form of the present invention, the brake drum being shown in section and broken away;

Fig. 2 is a transverse, sectional view taken on the line 2—2 of Fig. 1;

Fig. 3 is a fragmentary sectional view, similar to Fig. 1, illustrating a modified form of a portion of the brake mechanism shown in said figure; and Fig. 4 is a view similar to Fig. 3, showing a further modification of the same portion of the brake.

The same characters of reference designate the same parts in the different figures of the drawings.

Referring to the drawings, 2 designates the fixed disk or head which is usually secured to a portion of the axle housing and carries the brake-operating mechanism, and 3 designates the brake drum which is usually carried by the driving wheels, a pair of semi-circular brake bands or shoes 4 and 5 being connected to the disk 2 and adapted to be expanded into contact with the inner surface of the brake drum in the manner hereinafter described.

Referring particularly to Figs. 1 and 2, the shoes 4 and 5 are provided at their inner sides adjacent to their opposite ends with pairs of lugs 6 and 7 having perforated and bifurcated ears adapted to form pivotal supports for the operating members. The disk 2 is provided at a point intermediate its circumference and center, with bosses 8 and 9, one at each side thereof, which bosses are in alignment with each other and are bored to form a bearing for a shaft 10, to which is secured in any suitable manner the operating lever 11, said lever being provided at its free end with an eye 12 for connection with the usual brake rod which is well-known in motor vehicles.

The inner end of the shaft 10 carries a cam lever 13, shown herein as of substantially triangular shape in side elevation, this lever being secured in any suitable manner to the shaft or made integral therewith, the point of connection between the shaft and cam lever being at one of the apices of the lever. At another of its apices, the lever is pivotally secured between the ears of one of the lugs 7 carried by the brake shoe 5, while the remaining apex is bifurcated to receive one end of a link 14, which is pivoted to the cam lever by means of a stud 15, the opposite end of said link being pivoted between the ears of one of the lugs 6 carried by the brake shoe 4. A helical spring 16 secured at one end to the cam lever 13 and at its opposite end to the link 14 exerts its tension normally to pull these members, and consequently the ends of the respective brake shoes to which they are connected, toward each other.

From the foregoing it will be obvious that when the operating lever 11 is swung in the direction of the arrow shown in Fig. 1, the cam lever will be rocked so as to pivot in the lug 7 and on the stud 15, thus causing the brake shoes to move away from each other at that end and to slide around within the drum so as to approach each other at their diametrically opposite ends.

For evenly distributing the frictional contact of the brake shoes with the drum, I have shown in Figs. 1 and 2 an arrangement of toggle levers. In the present instance, a pair of links 17 and 18 are pivotally connected at one end to the respective lugs 6 and 7 carried by the brake shoes 4 and 5, the opposite ends of said links being pivoted on a common stud 19. Secured on the disk 2 is a bracket 20 having a threaded bearing for the reception of an adjusting screw stud 21, which is provided at one end thereof with a flange 22 adapted to abut against the side of the bracket 20 thereby to limit the backward movement of the stud in the bracket, said stud being also provided at its flanged end with a central axially extending opening for the reception of a swivel pin 23 having a flat head pivoted on the stud 19 between the ends of the links 17 and 18. The screw stud 21 may be provided at its opposite end with transversely extending openings 24 for the reception of a tool for rotating the stud, while the disk 2 is provided with a rectangular opening or window 25 for permitting manipulation of said tool when the brake and wheel are in assembled condition. This arrangement renders the brake readily adjustable at all times so as to compensate for wear of the brake shoes. A flat spring 26 having its opposite ends secured in notches in the lugs 6 and 7 respectively, serves to maintain the shoes under tension when retired and prevent any rattle of the parts.

It will readily be seen that when the lever 11 is operated to apply the brake, owing to the toggle connection above described, the lugs 6 and 7 shown at the upper part of Fig. 1 will move in the arc of a circle which is eccentric to the drum, whereby as they approach each other they will be forced by the toggle links 17, 18 with increasing pressure outwardly and thus engage the brake drum with correspondingly increasing friction.

Fig. 3 shows a modification of the toggle arrangement. In this form, the toggle links are in the form of turn buckles; that is to say, each of said links comprises an interiorly threaded member 27, which members are pivoted in common on a stud 28 secured in the disk 2, and a member 30 having a portion thereof exteriorly threaded to fit the opening in the member 27. The members 30 are provided with flat perforated heads which are pivoted respectively between the ears of the lugs 6 and 7, the pivots 31 being removable to permit the members 30 to be rotated so as to lengthen or shorten the toggle links.

In the modification shown in Fig. 4, the members 30 are threaded into the opposite ends of a single sleeve 32 which extends tangentially of the disk 2, and the pivots 31 are removable in the same manner as described in connection with Fig. 3 for permitting lengthening or shortening of the toggle connection between the lugs. In this form of the device, a coil spring 33 is preferably used in place of the flat spring shown in the other figures for retiring the brake shoes when the lever 11 is returned to inoperative position. For centering said spring, a bolt 34 passes transversely through the sleeve 32 and is secured therein by a nut 35, the head of which bolt is encircled by said spring and thereby retains the latter in its central position between the opposing ends of the brake shoes 4 and 5.

It will be seen that in all forms of the device herein described, the toggle connection serves the purpose of maintaining the opposing ends of the brake shoes spaced apart when the action of the operating lever causes them to move toward each other, the resultant of the action of the operating lever and toggle being to expand the shoes so as to evenly distribute the frictional engagement of the shoes with the drum over the entire peripheries of said shoes.

The arm 36 shown broken away and in dot and dash lines in Fig. 1 is secured to the disk 2 for convenience in attaching the brake to a motor cycle equipment.

Having thus described my invention, what I claim is:

A brake mechanism, comprising, in combination, a stationary member, a rotatable brake drum disposed in juxtaposition to said stationary member, a pair of oppositely disposed expansible brake shoes adapted to slide circumferentially within said drum, said brake shoes being spaced apart at their ends, a lever pivotally supported on said stationary member and pivotally connected to one end of one of said brake shoes, a link pivotally connected to said lever and to one end of the other brake shoe, and adjustable toggle connections between the opposite ends of the brake shoes.

In testimony whereof I have signed my name to this specification.

WILLIAM GEORGE BRYAN.